United States Patent [19]

Nelson

[11] 3,851,450
[45] Dec. 3, 1974

[54] FORAGE HARVESTER

[75] Inventor: Leon Franklin Nelson, Moline, Ill.

[73] Assignee: Deere & Company, Moline, Ill.

[22] Filed: June 1, 1973

[21] Appl. No.: 365,989

[52] U.S. Cl.................. 56/14.4, 56/364, 56/DIG. 1
[51] Int. Cl............................................ A01d 87/00
[58] Field of Search ...... 56/364, 14.3, 14.4, DIG. 1, 56/1

[56] References Cited
UNITED STATES PATENTS

| | | | |
|---|---|---|---|
| 3,282,404 | 11/1966 | Corwith et al. | 56/DIG. 1 |
| 3,523,411 | 8/1970 | Waldrop et al. | 56/364 X |
| 3,530,650 | 9/1970 | Phillips | 56/14.3 X |
| 3,540,199 | 11/1970 | Lenzer et al. | 56/364 |
| 3,643,720 | 2/1972 | Sadler et al. | 56/DIG. 1 |

*Primary Examiner*—Louis G. Mancene
*Assistant Examiner*—J. N. Eskovitz

[57] ABSTRACT

A tractor-mounted forage harvester has a main frame mounted for vertical adjustment on a tractor three-point hitch system and includes a windrow pickup-type harvesting header disposed alongside the right rear wheel of the tractor. The header includes a transverse auger which feeds the crop to a fore-and-aft auger, which in turn feeds the crop through a relatively narrow inlet. Two pairs of cooperating feed rolls engage the crop moving through the inlet, the upper roll of the forward pair of rolls and the lower roll of the rearward pair of rolls being vertically adjustable to accommodate different thicknesses of crop material. The feed rolls feed the crop through a cutterhead housing inlet past a transverse shear bar on the upper edge of the inlet to a cylinder-type cutterhead having a plurality of knives rotating at high speed in registry with the shear bar, the knives moving upwardly past the housing inlet to reduce the material and impel it upwardly and rearwardly through a tangential discharge spout into a trailing wagon. The cutterhead is formed by a shaft and a solid one-piece annular member removably mounted on the shaft and having radial portions with the knife-cutting edges formed thereon.

21 Claims, 5 Drawing Figures

FORAGE HARVESTER

BACKGROUND OF THE INVENTION

This invention relates to a forage harvester, and more particularly to an improved forage harvester of the type having a harvesting attachment or a header for removing the crop from the field and a reel or cylinder-type cutterhead for reducing the crop.

In some forage harvesters of the above general type, the cutterhead also serves as the impeller for discharging the reduced crop material, such machines being known as cut-and-throw-type machines, while on other machines, separate, blower-type elevators are utilized to discharge the crop. The cut-and-throw-type machines are obviously generally less expensive, while the latter machines have the advantage of providing a finer cut, particularly since recutter screens can be utilized with the cutterhead to further reduce the crop before it is delivered to the blower-type elevator.

In both cases, the crop conventionally moves into the cutterhead over a horizontal shear bar in registry with the cutterhead and the cutterhead knives move downwardly past the inlet and the shear bar with the crop moving downwardly and rearwardly before it is discharged by the cutterhead, although the reverse rotation is known.

The cutterheads in such forage harvesters in the United States have conventionally been relatively wide, ranging from 20–24 inches in width, although smaller cutterheads of approximately 12-inch widths are known and used chiefly outside the United States. While the speed of rotation of such cutterheads has varied substantially in different forage harvesters, the speed has generally fallen in the range between 700–1,300 RPM, although some of the European machines have operated at somewhat higher speeds. It has also been conventional to provide removable and adjustable knives on the cutterhead, the knives conventionally being mounted on at least two hubs or spiders attached to the cutterhead shaft. While this arrangement permits replacement of the individual knives and also permits adjustment of the knives to obtain proper registry with the shear bar, there has been some problems in locking the knives in place since they are subject to both impact during the cutting process and centrifugal force during rotation of the cutterhead.

Another problem associated with said cylinder-type cutterheads resides in the fact that crop material is often fed into the cutterhead crosswise rather than the normal endwise orientation, so that the relatively wide width of the cutterhead allows relatively long pieces of material to pass through the harvester unless a recutter screeen is utilized. Also, to obtain a relatively fine cut, it is necessary to drive the feed rolls at a relatively slow speed, which can cause bunching of crop material in front of the feed rolls.

SUMMARY OF THE INVENTION

According to the invention, there is provided an improved forage harvester of the type having a cylinder-type cutterhead. More specifically, the improved forage harvester provides a relatively fine cut of material and a relatively high capacity while utilizing a relatively inexpensive construction. The improved forage harvester is also lightweight and requires little maintenance.

An important feature of the invention resides in the fact that the cutterhead is rotated in the reverse direction from conventional forage harvesters, so that the knives move upwardly past the crop inlet past the shear bar on the upper edge of the inlet, discharging the crop material upwardly shortly after it is cut.

Additional important features of the invention reside in the fact that the cutterhead has a relatively narrow axial width, substantially less than conventional cutterheads; it has a relatively small diameter and it is rotated at a relatively high speed, substantially higher than the conventional cutterhead speeds. The narrow width of the cutterhead prevents excessively long crop material, even if the crop is fed crosswise into the cutterhead. The narrow-width small diameter cutterhead also reduces the size and weight of the machine, so that a modular approach can be utilized for a forage harvester, wherein more than one cutterhead is provided on the machine. For example, when utilized with a row-crop harvesting unit, a separate cutterhead could be provided for each row. The small size and light weight of the cutterhead also lends itself for mounting a forage harvester directly on a tractor, either in front of the tractor or alongside the tractor on the tractor three-point hitch. The high speed of the cutterhead provides a finer, more uniform cut of the material and also permits the feed rolls to be driven faster, so that they move faster than the ground speed, eliminating any bunching up of material in front of the feed rolls.

Another important feature of the invention resides in the arrangement of the feed rolls, wherein two pairs of feed rolls are provided, the upper feed roll in the forward pair of feed rolls being shiftable to vary the bite of the feed rolls, while the lower feed roll of the rear pair of feed rolls is shiftable toward and away from the opposite feed roll and the shear bear to accommodate the different thicknesses of the mat of material fed into the cutterhead. Also, the shear bar is positioned closely adjacent to the fixed feed roll of the rear pair of feed rolls so that it also functions as a stripper for said feed roll.

Another feature of the invention resides in the provision of a hold-down bar mounted for adjustment toward and away from the shear bar with the shiftable rear feed roll to prevent material from bouncing away from the shear bar after a part of the material is chopped off by the cutterhead.

Still another important feature of the invention resides in the construction of the cutterhead. More specifically, the cutterhead is solid and closed, and the knives are formed as an integral part of the cutterhead. Still more specifically, the cutterhead is formed by a shaft and at least one solid annular portion or hub removably mounted on the shaft, the hub being provided with radially extending portions which form the knives at the outer periphery of the cutterhead, the area between the adjacent knives forming pockets or recesses which receive the crop material as it is fed into the cutterhead. The knives can be provided with hardfacing along their circumferential surfaces so that they maintain their sharpness for a substantial period without adjustment or sharpening, the annular section or hub being easily removed or replaced when the knives are worn. Also, means are provided for easily removing the cutterhead and for replacing the annular section of the cutterhead.

Another feature of the cutterhead resides in the fact that the knives are spaced at uneven intervals, to disperse the vibrations during operation of the machine.

DESCRIPTION OF THE PREFERRED EMBODIMENT

Figure 1:
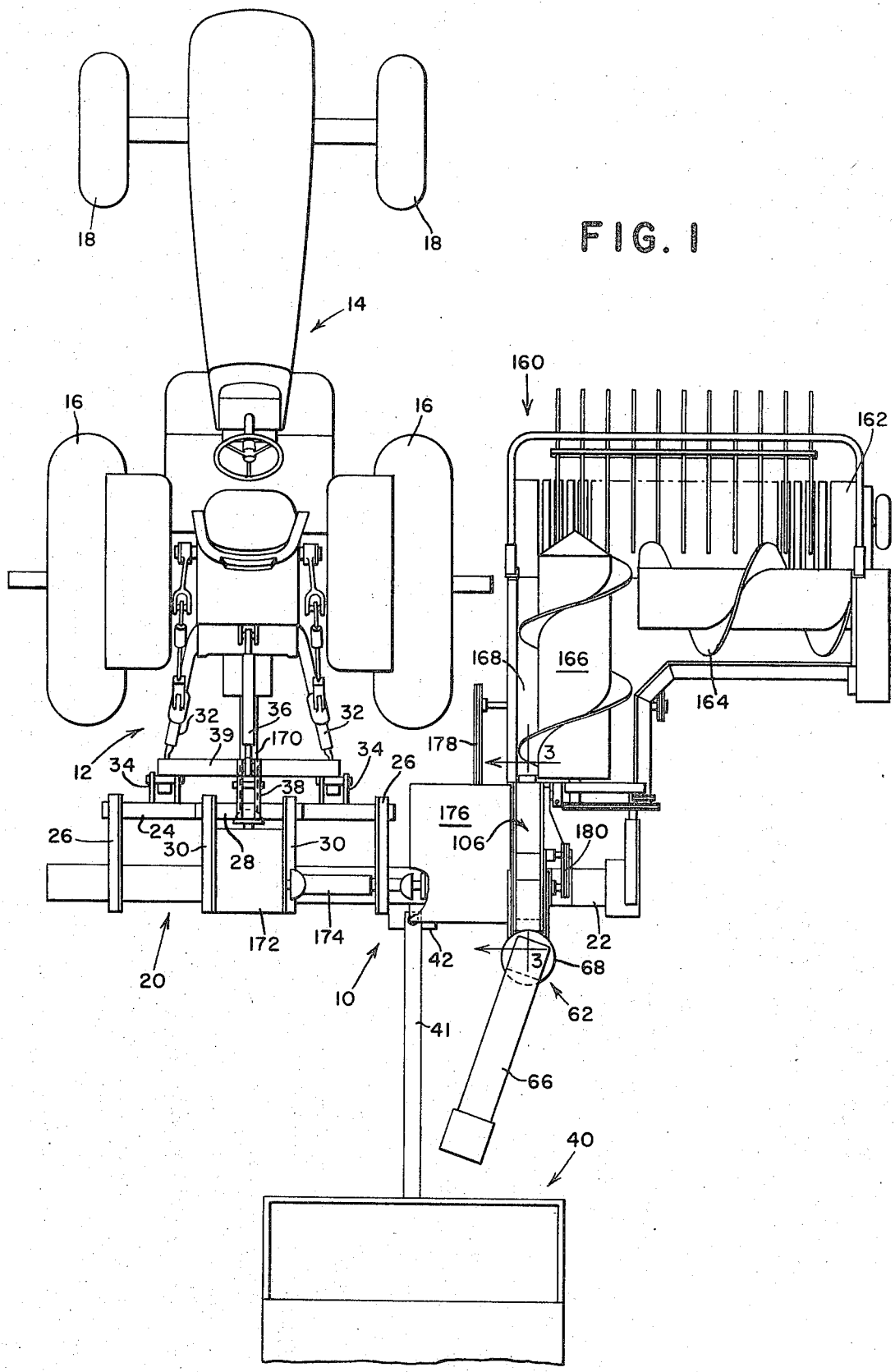
FIG. 1 is a plan view of a forage harvester embodying the invention mounted on the three-point hitch of a tractor and having a windrow pickup-type harvesting attachment.
Figure 2:
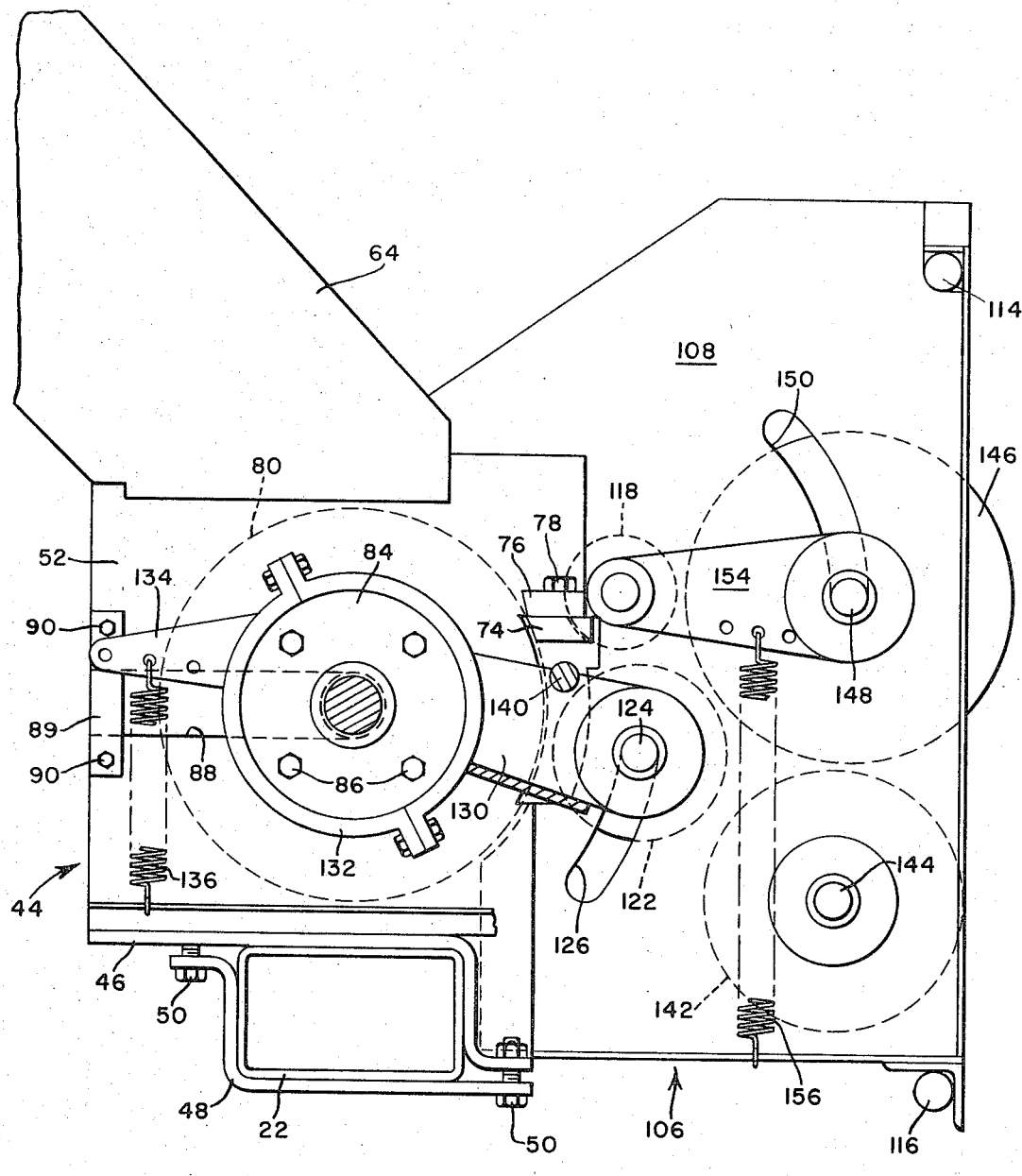
FIG. 2 is an enlarged right side elevation view of the forage harvester with the harvesting attachment and most of the discharge spout omitted.

The invention is embodied in a forage harvester, indicated generally by the numeral 10, mounted on a three-point hitch 12 of a tractor, indicated in its entirety by the numeral 14. As is conventional, the tractor has a pair of rear drive wheels 16 and steerable front wheels 18. The forage harvester 10 includes a generally transverse main frame 20, which includes a relatively large transverse beam 22 that substantially spans the width of the tractor and extends a substantial distance to the right of the tractor, as is apparent from FIG. 1. The frame also includes a smaller transverse beam 24 connected to the main transverse beam 22 by a pair of fore-and-aft members 26 forwardly of the main beam 22. An upper transverse beam 28 is disposed above the lower beam 24 and is connected to the main beam 22 and the lower beam 24 by a pair of fore-and-aft upright plates 30.

As is conventional, the three-point hitch 12 includes a pair of rearwardly extending lower links 32, which are connected to the lower front beam 24 at attachment points 34, and an upper link 36, which is connected to the upper beam 28 at an attachment point 38, the connection between the links and the attachment points being accomplished through a conventional coupler 39. As is well known, the forage harvester frame can be raised and lowered by adjusting the tractor three-point hitch.

A trailing wagon 40 has a forwardly extending tongue 41 attached to the main transverse beam 22 and is located to receive crops from the forage harvester.

The forage harvester 10 includes a cutterhead housing 44 mounted on the main transverse beam 22 behind and to the right of the right rear drive wheel 16. The cutterhead housing 44 includes a bottom plate 46 overlying the beam 22 and releasably clamped thereto by clamp member 48 that engages the underside of the beam 22 and is attached to the housing bottom plate 46 by a plurality of fasteners 50. As is apparent, the cutterhead housing can be removed from the main beam 22 by removing the fasteners 50, and it can also be laterally adjusted thereon by loosening the fasteners and sliding the housing to the desired location.

The housing includes a pair of opposite upright sidewalls 52 and 53 and an upright rear wall 54 extending between the opposite sidewalls. The housing has a forward crop inlet 56 and an upper outlet 58, the space between the inlet and the outlet being closed by an upwardly and rearwardly inclined front plate 60.

A discharge spout, indicated generally by the numeral 62, extends upwardly and rearwardly from the outlet 58 and includes an upwardly and rearwardly inclined lower part 64, having a rectangular cross section, and an upwardly and rearwardly arched upper part 66 connected to the upper end of the lower part by means of a swivel 68, which permits the upper part to swing about a vertical axis in the normal manner. The lower part terminates in a vertical portion, while the upper part 66 similarly has a vertical portion communicating with the lower part through the swivel 68. The lower part 64 includes an upper front wall 70 extending upwardly and rearwardly from the plate 60, and a lower rear wall 72 extending into the cutterhead housing past the upper edge of the rear wall 54.

A transverse shear bar 74 spans the width of the cutterhead housing 44 along the top edge of the inlet 56 and has a cutting edge 75 along its lower rear edge. The shear bar is supported by a transverse backup member 76 attached to the lower end of the front plate 60, and the opposite ends of the backup member and shear bar extend through openings in the opposite sidewalls, the shear bar being clamped to the backup member by a pair of bolts on opposite sides of the cutterhead housing. As is well known, the shear bar is adjustable in a fore-and-aft direction on the backup member by loosening the bolts 78 and shifting the shear bar to the desired position.

An axially transverse cylinder or reel-type cutterhead 80 is mounted in the cutterhead housing 44 and spans the width between the opposite sidewalls 52 and 53. The cutterhead includes an axial shaft 82 having its opposite ends extending through and journaled in a pair of bearings 84 respectively removably attached to the opposite sidewalls 52 and 53 by bolts 86. The sidewalls 52 and 53 are respectively provided with fore-and-aft slots 88 extending from the rear edge of the sidewalls to the openings for the cutterhead shaft 82. The slots 88 are normally closed by a pair of inserts 89 removably attached to the sidewalls by fasteners 90. As is apparent, the cutterhead can easily be removed from the housing 44 by removing the inserts 89 from the slots 88, removing the rear wall 54, and detaching the bearings 84 from the opposite sidewalls, at which time the cutterhead 80 is shiftable out through the rear of the housing with the cutterhead shaft 82 sliding along the slots 88. Of course, the drives attached to the shaft 82 must first be disconnected before the cutterhead is removed.

The cutterhead is formed by a solid one-piece annular section or member 92 keyed to the shaft 82 by a key 93 and axially retained thereon by a pair of annular disks 94 removably attached to the opposite sides of the annular section 92 by fasteners 95. As is apparent, the disks 94 on opposite sides of the annular section 92 engage a pair of shoulders 96 on the cutterhead shaft 82 to prevent the annular section from axially shifting on the shaft, the annular section being easily removable from the shaft by removing the fasteners 95 and sliding the annular section off the shaft.

The annular section 92 includes a solid hub portion 97 and a plurality of generally radially extending knife portions 98 extending radially from the hub portion to the cutterhead periphery. The outer ends of the knife portions 98 have cutting edges 99 generally parallel to the cutterhead axis on the advance side of the radial portions, with heal surfaces 100 trailing the cutting edges adjacent the cutterhead periphery. The cutting edges 99 are all located on the cutterhead periphery the same distance from the cutterhead axis and trace a cylinder as the cutterhead rotates. The advance side of each knife portion has a relieved area 102 inwardly of the cutting edge, and in the area between adjacent knife portions 98 form outwardly open pockets 104 which receive the crop material as it is fed past the shear bar 74 into the cutterhead. The shear bar cutting edge 95 is maintained in close registry with the periphery of the cutterhead 80, and, as is apparent from FIG. 3, the rearward side of the shear bar 74 is angled upwardly and rearwardly so that it is maintained relatively close to the cutterhead periphery. Preferably the heal surface 100 of each knife portion and the rear surface of the shear bar 74 adjacent the cutterhead periphery are provided with a hardened, wear-resistant surface, such as tungsten carbide, as described in U.S. Pat. No. 3,635,271. The hardened surfaces on the knives maintain a sharp cutting edge 99 without the frequent maintenance required on most cutterheads, and when the cutting edges finally do deteriorate, the entire annular section 92 is replaced. As is apparent from the above, the cutterhead is easily removed and the annular section is quickly removed from the cutterhead shaft for replacement.

The cutterhead in the illustrated embodiment is only 6 inches wide and 12 inches in diameter, the cutterhead having a much narrower width and smaller diameter than conventional cutterheads. The annular section 92 is readily formed from steel by a flamecutting process. However, since the thickness of material that can be cut by such a process is limited, if a somewhat wider cutterhead is desired, it might be necessary to form the cutterhead from a pair of coaxially stacked annular sections 92 if such a process is utilized.

Figure 4:
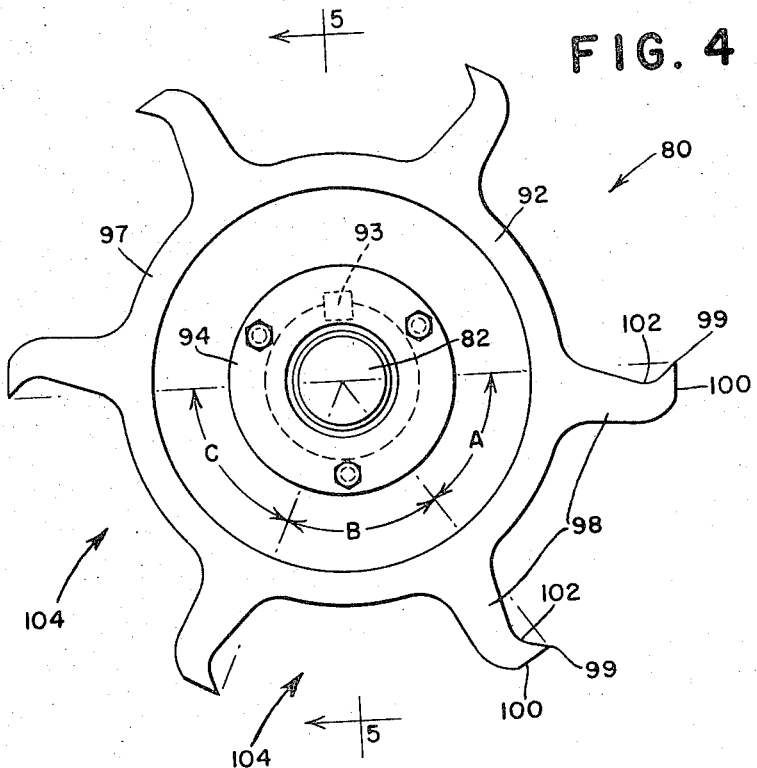
FIG. 4 is an enlarged end view of the cutterhead removed from the forage harvester.
Figure 5:
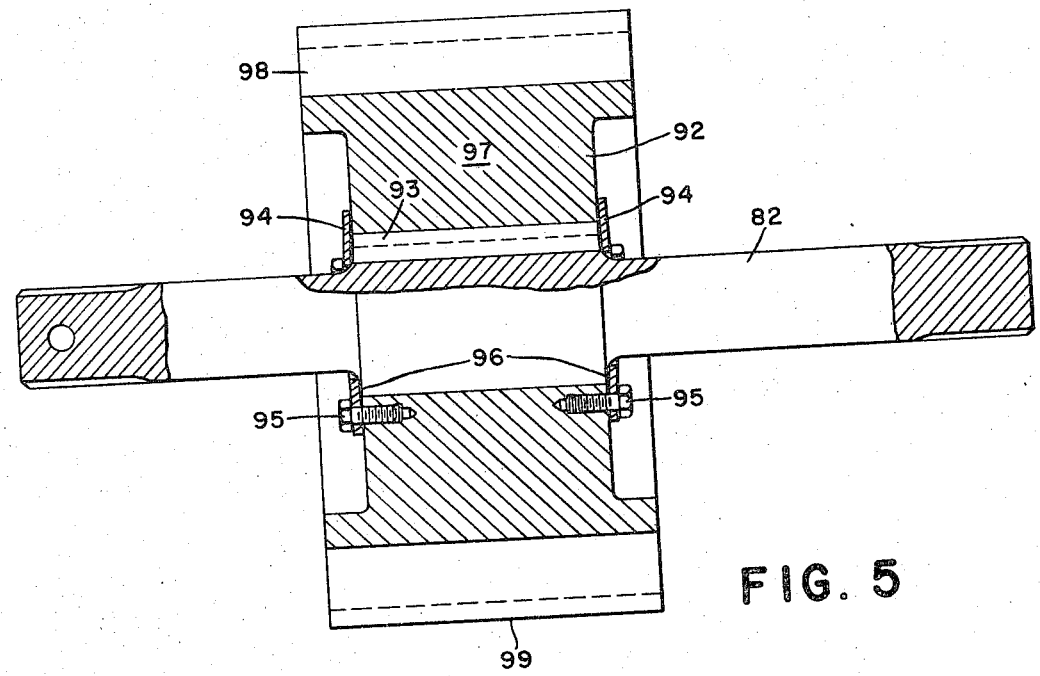
FIG. 5 is an axial section of the cutterhead as viewed along the line 5—5 of FIG. 4.

In the illustrated embodiment, the cutterhead is provided with six cutting edges 99 formed by three pair of diametrically opposed knife portions, which maintain the cutterhead in balance. However, different spacings are provided between adjacent knives to vary the interval between impacts when the cutterhead is in operation, thereby dispersing the vibration and the noise. For example, in the illustrated embodiment in FIG. 4, the angle A between two adjacent cutting edges is 55°, the angle B between the next two cutting edges is 60°, and the angle C between the succeeding cutting edges is 65°.

Attached to the front of the cutterhead housing 44 is a feed roll housing 106 having right and left upright sidewalls 108 and 109 respectively extending forwardly from the cutterhead housing sidewalls 52 and 53. The feed roll housing has a top wall that extends rearwardly to the front wall 70 of the discharge spout and a bottom 112 extending forwardly from the cutterhead housing bottom plate 46. As is conventional, the feed roll housing is open forwardly and its rearward end communicates with the cutterhead housing inlet 56. A pair of upper attachment points 114 extend outwardly from the upper front of the feed roll housing and a similar pair of lower attachment points 116 extend outwardly from the lower front end of the feed roll housing.

Figure 3:
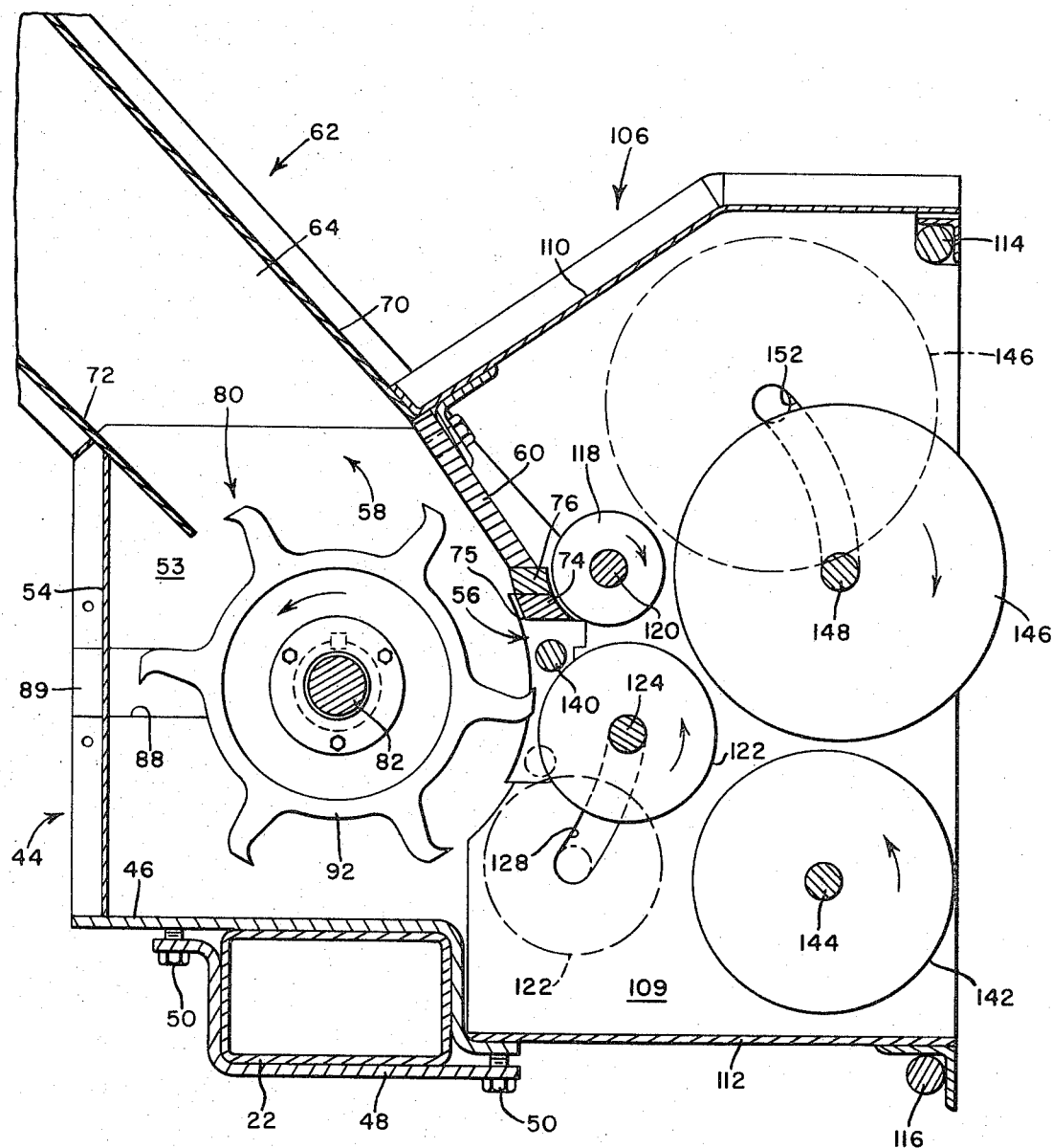
FIG. 3 is a vertical section of the forage harvester similar to and on the same scale as FIG. 2 as viewed along the line 3—3 of FIG. 1.

Mounted in the feed roll housing and spanning the width between the housing sidewalls is an upper rear feed roll 118 axially parallel to the cutterhead 80. The feed roll 118 includes an axial shaft 120 having its opposite ends extending through the feed roll housing sidewalls and journaled in bearings therein. As best seen in FIG. 3, the forward side of the shear bar 74 and the backup member 76 are concave concentric with the axis of the feed roll 118 and are disposed proximate to the feed roll periphery, so that the forward edge of the shear bar 74 functions as a stripper for the upper front feed roll as the feed roll rotates in the direction of the arrow in FIG. 3.

A lower rear feed roll 122 is disposed opposite the feed roll 118 and rotates in the opposite direction therefrom in the direction of the arrow in FIG. 3, the bite between the rolls being adjacent the inlet 56 and the rolls rotating to feed crop material through the inlet. The lower roll 122 includes an axial shaft 124, the opposite ends of which extend through arcuate slots 126 and 128 in the sidewalls 108 and 109, respectively, and are journaled in arms 130 that include annular hubs 132 rotatable on the bearings 84, so that the lower roll 122 is shiftable in an arc about the axis of the cutterhead toward and away from the upper roll 118 to vary the bite between the rolls. The hubs 132 have rearwardly extending arms 134, and tension springs 136 respectively have their lower ends attached to the forage harvester frame and their upper ends connected to the arms 134, so that the lower roll 122 is biased upwardly towards the opposite feed roll 118, the upper ends of the slots 126 and 128 establishing the uppermost positon of the roll as illustrated in FIG. 3. As is apparent, alternate attaching points are provided for the springs 136 on the arm 134 to vary the biasing force on the feed roll.

An axially transverse hold-down bar 140 spans the width of the housing and has its opposite ends extending through the same openings in the sidewalls as the shear bar. The ends of the bar 140 are connected to the arms 130, so that the hold-down bar swings with the feed roll 122. The hold-down bar is disposed immediately below and opposite the shear bar 74 and acts to prevent crop material from bouncing downwardly away from the shear bar 74 after succeeding impacts from the cutterhead 80.

A lower front feed roll 142 is disposed forwardly of the feed roll 122 and rotates in the same direction, the feed roll 142 also including a transverse axial shaft 144 having its opposite ends journaled in the opposite sidewalls. An upper front feed roll 146 is disposed opposite and above the feed roll 142 and includes an axial shaft 148 having its opposite ends extending through arcuate slots 150 and 152 in the feed roll housing sidewalls 108 and 109, the axis of the upper rear feed roll 118 being the center of curvature for the slots 150 and 152. The opposite ends of the shaft 148 are carried in a pair of arms 154 swingably mounted on the opposite ends of the upper rear feed roll shaft 120, so that the upper roll 146 is swingable toward and away from the lower front roll 142 in an arc about the axis of the upper rear roll. The upper front feed roll 146 is biased toward the lower front roll 142 by a pair of tension springs 156 operative between the frame and the arms 154, alternate mounting points again being provided on the arms to vary the biasing force. As shown by the arrows in FIG. 3, the upper front roll rotates in the same direction as the upper rear roll so that the front rolls feed the crop material to the bite between the rear feed rolls.

A harvesting attachment, indicated generally by the numeral 160, is removably mounted on the front of the feed roll housing 106 on the attachment points 114 and 116 in the conventional manner and operates to remove crop from the field and deliver it to the bite between the front feed rolls 142 and 146. The attachment 160 in the illustrated embodiment is a windrow pickup unit that includes a forward, axially transverse pickup 162 operative to raise windrowed crops laying in the field as the machine advances and deliver the crop to a transverse auger 164, which feeds a fore-and-aft auger 166. The fore-and-aft auger 166 moves the crop rearwardly along a fore-and-aft passage 168 along the left side of the auger, the passage being substantially the same width and in alignment with the feed roll housing 106, so that the crop is discharged into the bite between the front feed rolls.

The tractor includes a conventional rear PTO that drives a fore-and-aft PTO shaft 170 that serves as the input to a bevel gearbox 172 mounted on the forage harvester frame 20 between the upright plates 30. The gearbox 172 has a transverse output connected to a transverse drive shaft 174 disposed above the transverse beam 22. The drive shaft 174 serves as the input to a transmission 176 mounted on the frame along the left side of the cutterhead housing 44. Such transmissions are well known and therefore the transmission is somewhat schematically shown in FIG. 1 and will not be described in detail. As is conventional, the transmission has several outputs, one of which is connected to the cutterhead shaft 82 to drive the cutterhead 80 in a counterclockwise direction as viewed in FIG. 3 at approximately 2,400 RPM. The transmission 176 also drives the feed rolls in the direction of the arrows in FIG. 3, the speed of the rolls being selectively variable by shifting the transmission in a known manner. The harvesting attachment 160 is also driven at a constant speed through the transmission 176 by a header drive 178. The hold-down bar 140 is also rotated in the same direction as the cutterhead 80 by a drive 180 at the right side of the cutterhead housing, connecting the end of the cutterhead shaft to the end of the holddown bar.

In operation, the harvesting attachment 160 delivers the crop material to the forward feed rolls 142 and 146 as previously described, which in turn feed the material between the rear feed rolls 118 and 122, which feed the material through the inlet 56 between the hold-down bar 140 and the shear bar 74. The rotating cutterhead 80 registers with the shear bar cutting edge 75 so that succeeding increments of crop are severed from the remaining crop by succeeding knife-cutting edges 99. The cutterhead in the illustrated embodiment is rotated at approximately 2,400 RPM, which is substantially higher than a conventional cylinder-type cutterhead, although somewhat lower speeds such as 1,700–1,800 RPM could also be utilized. As the cutterhead rotates, the severed crop is received in the pockets 104 between adjacent knives and impelled tangentially upwardly and rearwardly at a high velocity through the lower part 64 of the discharge spout 62. As is apparent, the rotation of the cutterhead is reversed from conventional cutterhead rotation and the cutterhead discharges the crop immediately after cutting it rather than moving the crop in an arcuate path before discharge. The reduced crop has a relatively high velocity so that its momentum and the air blast through the discharge spout easily carries the crop rearwardly through the discharge spout to the trailing wagon 40. The high speed rotation of the cutterhead provides a finer cut for a given feed rate than the slower conventional speeds and allows a higher feed rate speed by the feed rolls. Since the feed rolls can be rotated at a higher speed, it is possible to move the material at a faster rate than the ground speed of the machine, to prevent bunching up of the material in front of the feed rolls.

The cutterhead is substantially narrower than the conventional cutterhead, and the mat of material being fed into the cutterhead is relatively thick. Since the cutterhead is only 6 inches wide, even if material is fed into the cutterhead crosswise, the maximum length of cut would be 6 inches. The solid cutterhead prevents material from becoming entangled in the interior of the cutterhead, which would hinder the proper discharge of the material. The solid cutterhead also provides a high strength cutterhead, wherein the knives do not creep outwardly due to cutterhead impacts and centrifugal force. As previously described, the cutteread is a low maintenance cutterhead, and can be easily replaced after it is worn. The narrow width of the forage harvester, including the feed rolls and the cutterhead, results in a lighter weight, less expensive machine, that is also more adaptable for mounting on a tractor than the conventional heavier machines. As previously described, the compact size of the forage harvester would also allow the mounting of more than one cutterhead and feed-roll system on the same machine, so that a separate cutterhead could be provided for each row or windrow when more than one windrow or row of crops is being harvested at the same time.

I claim:

1. A forage harvester comprising: a mobile main frame mounted for advance over a field; a cutterhead housing mounted on the frame and having a crop inlet and a crop outlet spanning the width of the housing and a discharge spout extending upwardly from the outlet; a crop-feeding means mounted on the frame for moving crop material through the inlet; a forward harvesting means mounted on the frame for removing the crop from the field as the harvester advances and delivering it to the crop-feeding means; a shear bar disposed along the upper edge of the crop inlet; a cylinder-type cutterhead mounted in the cutterhead housing and having a plurality of knives with cutting edges on the cutterhead periphery tracing a cylinder in registry with the shear bar as the cutterhead rotates and having an axial length less than 12 inches; means for driving the cutterhead at a speed above 1,600 RPM so that the knives move upwardly past the inlet at a high velocity to reduce the crop moving through the inlet under the shear bar and impel the reduced crop tangentially upwardly through the outlet and the discharge spout.

2. The invention defined in claim 1 wherein the crop-feeding means includes a plurality of rotatable feed rolls axially parallel to the cutterhead and including a first feed roll having a fixed axis and disposed adjacently in advance of the shear bar, a second feed roll operatively mounted below the first feed roll adjacent the crop inlet and shiftable toward and away from the first feed roll, a third feed roll having a fixed axis and disposed adjacent to and in advance of the second feed roll and a fourth feed roll in advance of the first feed roll and shiftable toward and away from the third feed roll.

3. The invention defined in claim 1 wherein the crop-feeding means includes a first feed roll and the shear bar has a forward edge immediately adjacent the first feed roll for stripping crop material from the first feed roll.

4. The invention defined in claim 1 wherein the crop-feeding means includes a first feed roll having a fixed axis parallel to the cutterhead axis and disposed adjacently in advance of the shear bar, a second feed roll parallel to the first on the opposite side of the crop inlet and shiftable toward and away from the first feed roll, and a hold-down bar mounted adjacently parallel to the second feed roll and shiftable therewith toward and away from the shear bar to vary the size of the crop inlet opening and to limit the movement of crop material away from the shear bar opposite the movement of the cutterhead knives relative to the shear bar.

5. The invention defined in claim 4 wherein the second feed roll and the hold-down bar are mounted for rocking adjustment about the cutterhead axis.

6. The invention defined in claim 1 wherein the cutterhead is driven at a speed greater than 2,000 RPM.

7. The invention defined in claim 1 wherein the cutterhead includes an axial shaft and at least one annular section removably mounted on the shaft, each annular section including a solid hub portion and a plurality of approximately radially extending knife portions integral with the hub portion and forming said knives at the cutterhead periphery and pockets between the adjacent knife portion for receiving the crop material as it is fed into the cutterhead.

8. The invention defined in claim 7 wherein each knife portion has a relieved area on its advance side.

9. The invention defined in claim 7 wherein each cutterhead section is keyed to the shaft and axially restrained thereon by removable retainer means.

10. The invention defined in claim 1 wherein the cutterhead housing includes opposite upright sidewalls and the cutterhead includes an axial shaft having its opposite ends extending through openings in said sidewalls and journaled in bearings respectively removably attached to the sidewalls, the sidewalls respectively having elongated slots connecting said openings with the rearward ends of the sidewalls, to permit the removal of the cutterhead out the rear of the housing when the bearings are detached from the sidewalls by sliding the shaft rearwardly along the slots.

11. A forage harvester comprising: a mobile main frame mounted for advance over a field; a cutterhead housing mounted on the frame and having a crop inlet, an outlet, and a shear bar spanning the width of the housing adjacent the inlet; a cylinder-type cutterhead mounted in the housing and having a plurality of knives with cutting edges at the cutterhead periphery registering with the shear bar as the cutterhead rotates; a forward harvesting means mounted on the frame for removing the crop from the field as the machine advances; and a crop-feeding means for moving the crop material from the harvesting means through the inlet and including a first feed roll having a fixed axis parallel to the cutterhead axis and disposed adjacent to an in advance of the shear bar, a second feed roll parallel to the first feed roll on the opposite side of the inlet and mounted for adjustment toward and away from the first feed roll, a third feed roll having a fixed axis parallel to and adjacently forwardly of the second feed roll, and a fourth feed roll parallel and adjacent to the first feed roll and on the opposite side of the inlet from the third feed roll and operatively mounted for shifting toward and away from the third feed roll.

12. The invention defined in claim 11 and including a holddown bar mounted adjacently parallel to the second feed roll opposite the shear bar and operatively mounted for shifting with the second feed roll toward and away from the shear bar to vary the size of the crop inlet opening and to limit the movement of the crop material away from the shear bar in a direction opposite the movement of the cutterhead knives relative to the shear bar.

13. The invention defined in claim 11 wherein the shear bar has a forward edge immediately adjacent the first feed roll for stripping crop material therefrom.

14. In a forage harvester having a mobile main frame, a cutterhead housing mounted on the frame and having a crop inlet with a shear bar spanning the width of the housing along a horizontal edge of the inlet, a cylinder-type cutterhead mounted in the housing and having a plurality of knives registering with the shear bar as the cutterhead rotates, improved crop-feeding means mounted on the frame for moving crop material from a forward harvesting means through the crop inlet to the cutterhead and comprising: a plurality of rotatable feed rolls axially parallel to the cutterhead and including a first feed roll having a fixed axis and disposed adjacently in advance of the shear bar, and a second feed roll operatively mounted opposite the first feed roll and on the opposite side of the crop inlet from the shear bar for shifting toward and away from the first feed roll, and a hold-down bar adjacently parallel to the shear bar and spanning the width of the inlet opening and operatively mounted for shifting with the second feed roll toward and away from the shear bar to vary the inlet opening and limit the shifting of crop material off of the shear bars as it is fed to the cutterhead.

15. The invention defined in claim 14 wherein the second feed roll and hold-down bar are mounted for shifting in unison about the axis of the cutterhead.

16. In a forage harvester having a mobile main frame mounted for advance over a field, a cutterhead housing mounted on the frame and having an outlet and a crop inlet with a shear bar along one edge of the inlet, and a crop-feeding means for moving crop material from a forward harvesting means through the inlet, the combination therewith of an improved cutterhead journaled in the cutterhead housing and comprising: an axial shaft having its opposite ends journaled in bearings mounted in the opposite cutterhead housing sidewalls; and at least one annular section removably mounted on the shaft and including a solid hub portion and a plurality of approximately radially extending knife portions integral with the hub portion, the knife portions each having a generally longitudinally extending cutting edge at the cutterhead periphery generating a cylinder as the cutterhead rotates in registry with the shear bar, the spaces between adjacent knife portions forming pockets for receiving crop material as it is fed over the shear bar into the cutterhead.

17. The invention defined in claim 16 wherein each knife portion has a relieved area on its advance side interiorly of the cutting edge.

18. The invention defined in claim 17 wherein each cutterhead section is keyed to the shaft and axially restrained by removable retainer means operatively connecting the cutterhead section and the shaft.

19. The invention defined in claim 16 wherein at least two different angular spacings are provided between adjacent knife-cutting edges to vary the interval between succeeding impacts between the knife-cutting edges and the crop material as the cutterhead rotates at a relatively constant speed.

20. A forage harvester comprising: a mobile main frame mounted for advance over a field; a cutterhead housing mounted on the frame and having a crop inlet less than 8 inches wide spanning the width of the housing and a tangential crop outlet with a discharge spout extending upwardly from the outlet; a forward harvesting means mounted on the frame for removing the crop from the field as the machine advances; a crop-feeding means mounted on the frame for moving crop material from the harvesting means through the crop inlet; a horizontal shear bar spanning the crop inlet along one edge; a cylinder-type cutterhead mounted in the cutterhead housing and having a plurality of knives with cutting edges on the cutterhead periphery tracing a cylinder in registry with the shear bar as the cutterhead rotates; means for driving the cutterhead above 2,000 RPM so that the knife-cutting edges engage the crop moving through the inlet past the shear bar to sever the crop, the knives impelling the severed crop tangentially through the outlet and upwardly through the discharge spout.

21. The invention defined in claim 20 wherein the cutterhead includes an axial shaft and an annular section removably mounted on a shaft, said annular section including a solid hub portion and a plurality of approximately radially extending knife portions integral with the hub portion and forming said knives, the space between the adjacent midportions defining pockets for receiving the crop material as it is fed into the cutterhead past the shear bar.

* * * * *